3,408,627

TRAINING ADJUSTED DECISION SYSTEM USING SPATIAL STORAGE WITH ENERGY BEAM SCANNED READ-OUT

Charles L. Kettler, Austin, Joseph A. Walston, Dallas, and Morton E. Jones, Richardson, Tex., assignors to Texas Instruments Incorporated, Dallas, Tex., a corporation of Delaware Filed Dec. 28, 1964, Ser. No. 421,369
15 Claims. (Cl. 340—172.5)

ABSTRACT OF THE DISCLOSURE

Disclosed is a training adjusted decision system using spatial storage with energy beam scanned read-out. Adaptive weight values stored in an array of adaptive elements are modulated in accordance with predetermined weighting factors and read out by a scanning beam of energy to produce an optical signal which is further modulated optically by input data. The signal is then transformed into an electrical signal and integrated and compared with one or more threshold values to classify the input data or produce a decision.

The present invention relates to trainable decision systems which are also known as self-organizing systems, learning machines, nerve nets, or adaptive systems.

Adaptive decision systems have been extensively explored during the past several years. Some of the most notable systems to date include the Adaline, illustrated in FIGURE 1, and Madaline systems at Stanford Electronic Laboratory, the Perceptron at Cornell Aeronautical Laboratories, and the Minos I and II at Stanford Research Institute. The heart of these trainable or adaptive systems is an adaptive storage element which produces an analog weight factor dependent upon the system's previous experience in a training program. Perhaps the simplest example of an adaptive element is merely a mechanically variable resistance as used in the Adaline system. The resistance value or "stored weight" may be selectively increased or decreased by an analog quantity, and the stored weight value may be "read out" merely by applying a voltage across the resistance without changing the value of the resistance. In such a system, a set of variable resistors would be used to store a set of adapted weight values. A set of input values would be applied in the form of voltages so that a set of product signals in the form of currents are produced representative of the input value and the corresponding adaptive weight value. The product signal currents are then summed and compared to one or more threshold levels to classify the set of input data. During the training period of the system, the weight values of the resistances would be varied in a manner to better enable the system to make the correct decision.

In all trainable decision systems, the accuracy with which decisions can be made and the usefulness of the machine increase with the number of adaptive components employed. The adaptive elements heretofore available have in general been too large and too expensive for application in other than experimental systems or in systems requiring only a relatively small number of components. Mechanically variable resistors are, of course, impractical except for basic research work. Electromechanically variable resistors are too large and expensive to be practical. Thermistors have been suggested but have serious drawbacks in terms of value retention period and the type of signals available. Simple systems using capacitors as charge integrators are inherently very slow in operation, and when sufficient circuitry is used to speed up operation, such systems become too complex and expensive. Chemical devices which employ a reversible electrochemical reaction, or a reversible electroplating reaction, have also been used but are too expensive. Various magnetic flux integration devices such as the transpolarizer have been proposed but they too are complex and expensive. Elements utilizing a magnetic tape-wound core have also been proposed and offer good dynamic range, but each element requires a separate control circuit. Thus the available adaptive components are quite cumbersome and expensive and as the number required for a particular system increases, the practicability of these components decreases.

Another very important shortcoming of the various types of adaptive elements heretofore proposed in that all require multiple electrical connections to each of the elements. Obviously if a large number of adaptive elements are utilized, the sheer bulk and complexity of the lead wires becomes prohibitive as a practical matter.

Therefore it is an important object of the present invention to provide a trainable decision system wherein a very large number of adaptive elements is attainable with a minimum amount of hardware.

A further object of the invention is to provide a training adjusted decision system which utilizes only commercially available components.

A further object of the invention is to provide a system of the type described in which each set of input data may be either in the space domain or time domain.

Another object of the invention is to provide a training adjusted decision system in which a large number of adaptive elements is used, but in which no separate electrical lead wires are connected to each of the individual elements.

Yet another object is to provide a system for converting data stored in the spaced domain to data in the time domain.

Another object of the invention is to provide a very simple slave system for decision making or classification which requires a minimum of components.

Still another object is to provide a system capable of utilizing optically processed data.

A further object of the invention is to provide a system of the type described which may be used for making decisions based on multivariate input data.

Another object of the invention is to provide a system for producing permanently stored weight values which may be used in subsequent training procedures or in a slave system.

These and other objects are carried out by storing a set of adaptive weight values in an array or matrix of adaptive elements. The weight value of each element can be sequentially altered or adapted by a scanning beam of energy. The set of weight values stored in the matrix of adaptive elements is then sequentially "read out" by a scanning beam of energy, thus converting the set of weight values stored in the space domain to a corresponding set of weight values carried in the time domain. The set of weight values in the time domain is sequentially modulated by a corresponding set of input values such that each bit of the time domain data will be the product of an input value and the corresponding adaptive weight value. The set of product values carried in the time domain is integrated and the integration value compared to one or more threshold values to classify the set of input values or produce a decision. In accordance with another aspect of the invention, the adapted weight values in the time domain may be converted back to the space domain, the entire set of weight values simultaneously multiplied with a corresponding set of input values in the space domain, and the product values summed and compared to one or more threshold values for classification.

In accordance with a more specific aspect of the invention, the matrix of adaptive elements comprises the storage screen of a cathode ray storage tube. The charge recorded at discrete points on the storage screen may be selectively increased or decreased by passing an electron beam operated in the "write" mode over the discrete points so as to "adapt" the adaptive elements to produce the desired weight values. The adaptive weight values stored at discrete points on the storage screen then modulate a scanning electron beam operated in the "read" mode to produce an output signal representative of the modulated beam and therefore carrying the weight values in the time domain. The set of spatially stored adaptive weight values is thereby converted to a set of adaptive weight values carried in the time domain by the output signal from the storage tube. The output signal is modulated by a set of synchronized input values in the time domain. This may be accomplished either by modulating the "read" beam, or by modulating the output signal from the storage tube.

In accordance with another aspect of the invention, the time domain output signal from the storage tube is converted to a scanning beam of photon energy by the beam of a projection cathode ray tube which is modulated by the output signal and scanned in synchronism with the read beam of the storage tube. The beam of photon energy is then passed through a corresponding matrix of input data, such as a photographic transparency, to further modulate the photon beam and thereby produce product values of the adaptive weight value and the input value. The modulated photon beam is then sensed, integrated, and compared to one or more thresholds for classification.

In accordance with another aspect of the invention, the output signal from the storage tube carrying the adaptive weight values in the time domain is converted back to the spatial domain, such as a photographic transparency produced by photographing the face of a cathode ray tube, the electron beam of which is scanned in synchronism with the read beam of the storage tube and modulated by the output signal from the tube. Then a column of energy, such as photons, having uniform intensity across its aperture, is simultaneously modulated by the spatially-oriented adaptive weight data and by spatially-oriented input data, then summed and compared to one or more threshold values for classification.

In accordance with another aspect of the invention, a single matrix of adaptive elements, such as the storage screen of a single cathode ray storage tube, may be arbitrarily divided into a plurality of matrixes to provide a plurality of sets of adaptive elements. The read beam may be scanned in any desired manner over the storage screen to convert the spatially stored weight values to a time domain signal. Corresponding time periods of the time domain signal may then be modulated by input values and integrated or summed as previously described prior to comparison with one or more threshold values for classification. The classification decision of the several individual matrixes may then be utilized in any desired manner by logic circuitry to provide a final classification descision.

Additional aspects, objects and advantages of this invention will occur to those skilled in the art from the following detailed description and drawings, wherein.

Figure 1:
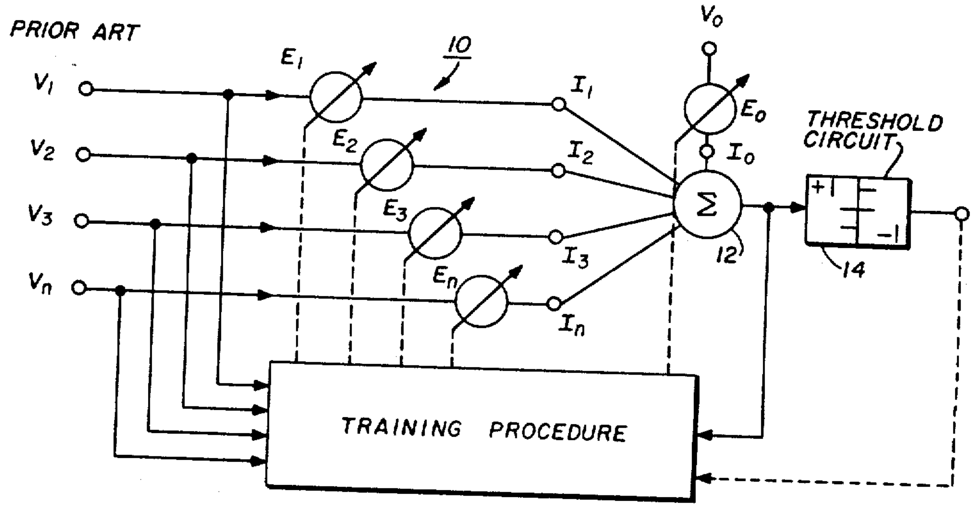
FIGURE 1 is a schematic diagram of a typical adaptive linear neuron, known as Adaline, which assists in illustrating the operation of the system of the present invention.

The present invention can best be understood by first describing the operation of the more basic training classification system illustrated in FIGURE 1, and designated generally by the reference numeral 10, which is the Adaline system used for research purposes at Stanford University. The Adaline system is sometimes referred to as an adaptive neuron and forms the basic building block of more complex systems, such as the Madaline, as is well-known in the art.

In the Adaline system 10, input signals in the form of voltages $V_1$ through $V_n$ are applied to the inputs of adaptive memory elements $E_1$ through $E_n$, respectively. The elements $E_1$–$E_n$ merely comprise manually adjustable resistances such that output signals in the form of currents $I_1$ through $I_n$ are produced which are functions of the respective input voltage signals $V_1$–$V_n$ and the resistance of the respective elements $E_1$–$E_n$. A constant voltage signal $V_0$ is applied to a variable resistor element $E_0$ to produce a current $I_0$ and thereby establish a threshold level hereafter described. The outputs of the elements $E_1$–$E_n$ and $E_0$ are connected to a summing circuit 12 which totals the currents $I_1$–$I_n$ and the current $I_0$. The output from the summing circuit 12 is applied to a threshold circuit 14 for comparison with a threshold value. The input signals $V_1$–$V_n$, the sum signal from the summing network 12 and the decision of the threshold circuit 14 are all taken into consideration by a training procedure which, in the case illustrated, is accomplished manually.

The Adaline system 10 is capable of classifying sets of input signals $V_1$–$V_n$ after the system is trained. The system is trained by applying a plurality of sets of input signals $V_1$–$V_n$ representative of a matrix pattern to the input terminals of the adaptive elements $E_1$–$E_n$. The currents $I_1$–$I_n$ through the elements $E_1$–$E_n$ are then summed and compared with one or more threshold levels. The resistance values of the elements $E_1$–$E_n$ are then each varied by a proportionate or uniform amount, depending upon the particular training procedure being used, so as to move the sum of the current $I_1$–$I_n$ toward the threshold level indicative of the correct classification for the particular set of input signals. Succeeding sets of input signals $V_1$–$V_n$ representative of the range of patterns which are to be classified are applied to the adaptive elements $E_1$–$E_n$. In each case the resistance values of the elements are adjusted in accordance with the selected training procedure. The sets of input signals $V_1$–$V_n$ are repeatedly applied to the system and the system adjusted until it correctly classifies each set of input data correctly. or until the number of errors made by the system is reduced to a minimum.

After the system is trained as described above, each of the elements $E_1$–$E_n$ will have a particular resistance value. Then a set of unknown input signals $V_1$–$V_n$ is applied to the system which results in a set of currents $I_1$–$I_n$. If the sum of the current values $I_1$–$I_n$ exceeds a particular threshold value, the set of unknown signals is placed in one classification, and if not, the data is placed in another classification. A number of threshold values may be employed to provide the number of different classifications. Any number of the basic systems 10 may be combined by means of logic circuitry to produce a Madaline-type system in which majority rule, unanimity, or any other system may be used to arrive at a final decision as is known in the art. However, in every case, the number of decisions which can be made, the number of sets of input signals $V_1$–$V_n$ which can be classified, and the accuracy of the system are all dependent upon the total number of adaptive elements employed.

Figure 2:
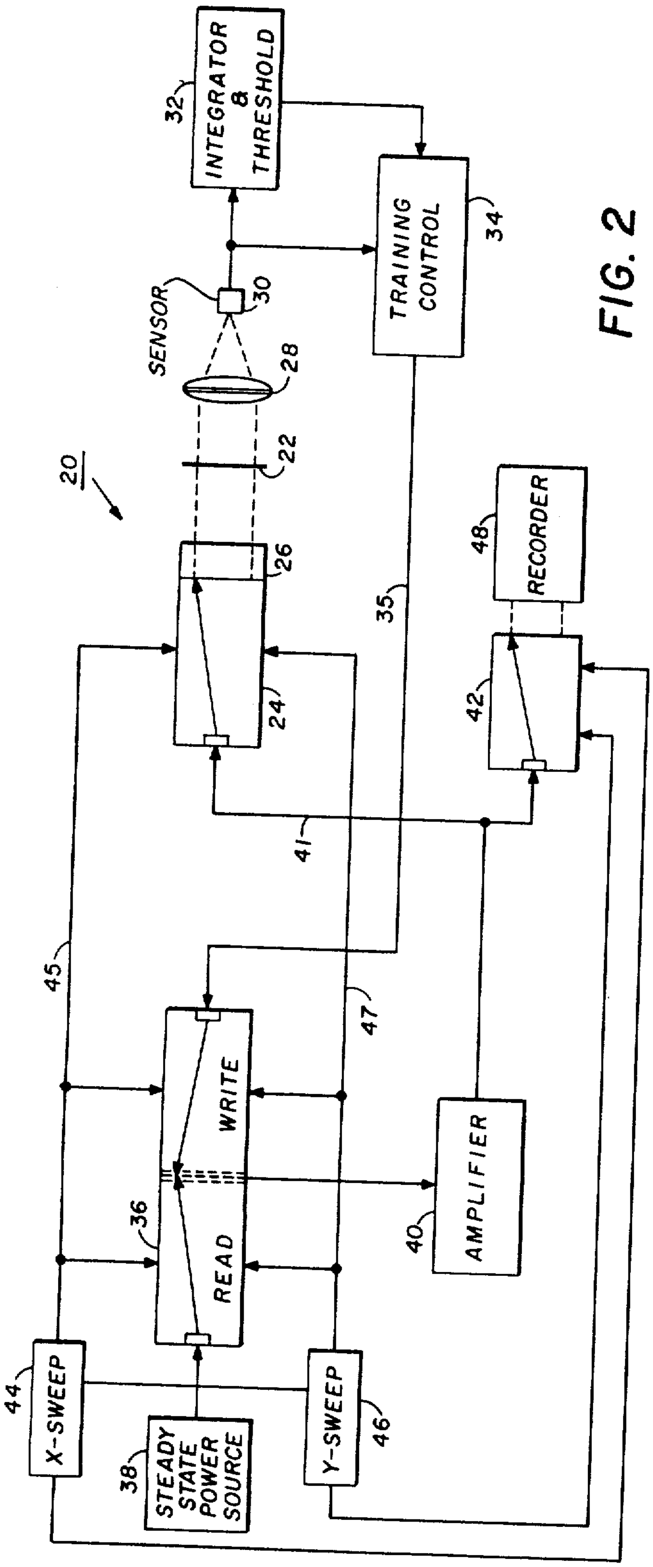
FIGURE 2 is a schematic block diagram of a training adjusted classification system constructed in accordance with the present invention.

Referring now to FIGURE 2, a trainable decision system constructed in accordance with the present invention is indicated generally by the reference numeral 20. In the system 20, input values corresponding to voltages $V_1$–$V_n$ as above are provided in the form of the transmissivity of discrete points of a photographic transparency 22. Thus the input data or signal is oriented in the space domain on the transparency 22. The spatially-oriented input data is converted to corresponding data in the time domain by a projection cathode ray tube 24 with a collimating optical system 26. As the beam of the cathode ray tube 24 scans the screen, the illuminated spot on the screen is projected by the optical system 26 through the transparency 22 as a photon beam. In some cases, the optical system may be eliminated and the input data transparency positioned in contact with the face of the tube 24. The photon beam is modulated in accordance with the transmissivity of the transparency 22 at the corresponding spatial point. The photon beam is converted to electrical energy by a suitable sensing system such as the lens 28 which focuses the photon beam on a phofon sensor 30.

The output from the sensor 30 is applied to an integrator and threshold circuit 32 which integrates the electrical system over a predetermined time period and compares the integrated value to one or more threshold values. The integrator and threshold circuit 32 provides a suitable readout for the system to indicate the classification arrived at by the system.

The classification decision of the integrator and threshold circuit 32 is also applied to a training control circuit 34. The output from the sensor 30 is also applied to the training control circuit 34 where it is modulated in accordance with the training procedure prior to application through conductor 35 to the cathode of the "write" gun of a cathode ray storage tube 36. The training control 34 may carry out any desired training procedure. Many training procedures are now known in the art and there appears to be a virtually unlimited number of possibilities yet untried. In general, the training procedure in this type of system is analogous to programming digital computers and must be fitted to the individual problems being solved. In general the training control 34 modulates the signal from the sensor 30 in response to the signal received from the integrator and threshold circuit 32 as will hereafter be discussed in greater detail. The modulated signal from the sensor 30 is then applied to modulate the electron beam of the cathode ray storage tube 36 which will hereafter be described in greater detail. The modulated electron beam of the write gun algebraically adds the discrete values of the time domain signal from the training control 34 to the "adaptive weight" values stored as charges at the spatial points on the storage grid of the cathode ray storage tube 36.

A steady state source 38 energizes the cathode of the "read" gun of the tube so that the adaptive weight values stored in the space domain by the cathode ray storage tube 36 are sequentially read out in the form of a time domain signal and applied to an amplifier 40. The output from the amplifier 40 is applied through conductor 41 to modulate the beam from the cathode of the tube 24 and the beam from the cathode of cathode ray tube 42. The electron read and write beams of the cathode ray storage tube 36 and the beams of the cathode ray tubes 24 and 42 are scanned in synchronism as represented by the X-sweep and Y-sweep generators 44 and 46 and the common conductors 45 and 47. The image displayed on the face of the cathode ray tube 42 may be recorded as a transparency by a recording camera 48 which may comprise any suitable camera or other photographic mechanism for producing transparencies. If desired, a camera may be positioned to record the image appearing on the face of tube 42.

Figure 3:
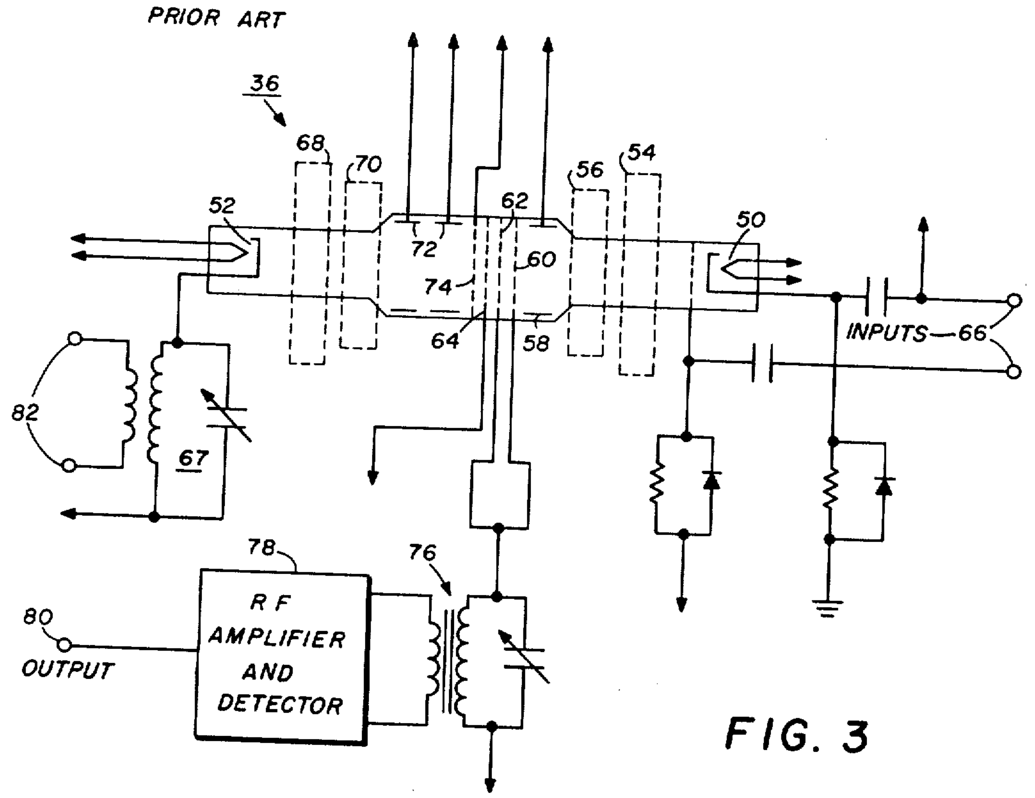
FIGURE 3 is a schematic diagram of a conventional cathode ray storage tube which may be used in the system of FIGURE 2.

Referring now to FIGURE 3, the cathode ray storage tube 36 provides a matrix of adaptive elements corresponding to the elements $E_1$–$E_n$ of the Adaline system 10. The cathode ray storage tube is commercially available from a number of manufacturers including Raytheon, Westinghouse, and Hughes, either in single gun or dual gun configuration. The cathode ray storage tube 36 is similar to a pair of cathode ray tubes and has a write gun cathode 50 and a read gun cathode 52. The electron beam from the write gun cathode 50 is focused by a conventional magnetic coil 54 and deflected by a magnetic coil 56 prior to passing through the electrostatic focusing plates 58. The beam then passes through a write decelerator screen 60 and a collector screen 62 prior to striking a storage screen 64. The intensity of the electron beam is determined by the signal applied to the inputs 66, and the number of electrons striking a particular point on the screen determines the change in the charge stored on the storage screen 64 as will hereafter be described in greater detail. The electron beam produced by the read gun cathode 52 is RF modulated by the circuit 67, is focused by magnetic coil 68, is deflected by magnetic coil 70 and is again focused by electrostatic plates 72. The beam then passes through a read decelerator screen 74 and a portion of the beam passes through the storage screen 64 prior to striking the collector screen 62. The portion of the beam passing through the storage screen is a function of the stored charge thereby providing a readout of the stored charge. The signal produced at the collector screen 62 as a result of the read beam is passed through the transformer 76 and the RF amplifier and detector 78 to output 80 which is connected to amplifier 40. The intensity of the read gun electron beam may be modulated by the signal applied to the read gun inputs 82. Additional control grids may be disposed in both the read and write guns between the respective cathodes and the screens for control purposes, as is well known in the art. However, for simplicity of illustration such grids have not been shown.

The storage screen 64 is comprised of a fine mesh metal screen with about a million holes per square inch and is coated with a dielectric material. This storage screen forms a matrix of adaptive elements, the number of elements depending upon the scanning pattern of the beams and the resolution capability of the tube. Resolutions of 1,000 TV lines have been attained which provide, ideally, $10^6$ adaptive elements. The scanning electron beam from the write gun cathode 50 is directed against the dielectric surface of the storage screen and, depending upon the potential of the storage screen with respect to the write gun cathode at the particular point in time, the beam charges the dielectric either positively or negatively. When the voltage of the storage surface is lower than a certain critical value, the secondary emission ratio will be less than unity, i.e., fewer electrons will leave the dielectric surface than strike it so that the surface will be charged in a negative direction toward cathode potential. On the other hand, if the dielectric surface is initially at a voltage higher than critical potential, each electron striking the storage screen will knock off more than one secondary electron and the surface will be charged in a positive direction. The storage screen continues to be charged as long as the voltage field directly before that surface is sufficiently positive to draw off the secondary electrons thus emitted.

Thus the voltage at the discrete points of the storage screen 64 may be progressively decreased in accordance with the number of electrons striking the particular point if the voltage of the storage screen is below the critical potential of the dielectric material so that when the surface is scanned with a beam it becomes charged negatively to cathode potential. On the other hand, if the storage screen voltage is substantially above the critical potential, the charge stored at the discrete points on the screen may be increased in proportion to the intensity of the beam and the period of time the beam strikes that particular point, i.e., the number of electrons striking each discrete point. The values of the charges stored on the screen 64 may be read out if the surface of the dielectric facing the write gun cathode is sufficiently negative to prevent electrons from passing through the storage screen toward the collector screen 62. In regions where the dielectric surface is less negative than the cut-off value of voltage, a portion of the electron beam that is a function of the voltage of that surface will pass through the storage screen and produce an output signal at the collector electrode. Both the write and read guns may be operated simultaneously in a two gun tube and cross talk is reduced to a minimum by the RF modulation of the read gun beam and the subsequent demodulation of the signal from the collector screen 62.

In summary, the values of the charges stored at any of the discrete points on the storage screen 64 may be selectively increased or decreased to "adapt" the values by modulating the write gun electron beam and simultaneously changing the voltage of the storage screen 64 to write for an increment or erase for a decrement. The adapted weight values stored on the storage screen 64 may be read out by a beam of constant intensity from the read gun. Or the beam from the read gun cathode 52 may be modulated in accordance with the set of input data as hereafter described in connection with FIGURE 8, in which case the output from the collector screen 62 at output 80 will be a function of the intensity (input data) of the read gun electron beam and the charge (adaptive weight) stored on the storage screen 64 at the particular point scanned by the beam.

Referring again to FIGURE 2, in training the system 20, a set of transparencies 22 representative of the range of input data the system is expected to classify is prepared. For example, if the system 20 is to be used for character recognition, the series of transparencies would include all of the characters to be identified, or classified, possibly including various orientations and letter styles of the same characters, for example. The storage screen 64 of the cathode ray storage tube 36 would be provided with a uniform charge such that the steady state beam from the read gun would produce a signal of constant amplitude which would be amplified by the amplifier 40 and applied to modulate the beam of the cathode ray tube 24. As the screen of the cathode ray tube 24 is scanned by the constant intensity beam, a beam of photons is propagated through corresponding spatial positions of the transparency 22 by the collimating lens system 26. At each point on the transparency 22, the beam of photons is modulated in accordance with the transmissivity of the transparency 22 at that particular point. The intensity of the photon beam is sensed by the sensor 30 to produce an electrical signal proportional, in the first instance, only to the input data on the transparency 22. The signal is integrated over a time period. The integration period is preferably at least equal to the time period required for the beam to scan the entire transparency 22 so that all of the values of the transparency 22 are summed and then compared to a threshold value.

Then based upon the comparison of the integration value and the threshold value, the training control 34 modulates each value of the instantaneous signal from the sensor 30 in such a manner as to adapt the weight values of the storage screen of the storage tube 36 and cause the integration value to move toward the correct threshold level indicative of the correct classification of the particular training transparency 22 being scanned. The training signal from the training control 34 is then applied through conductor 35 to modulate the electron beam from the write gun of the storage tube 36 and thereby alter or adapt the charge at corresponding points on the storage screen. During the second sweep cycle, the steady state beam from the read gun produces an output signal from the storage tube 36 that is representative of the values of the adapted weights stored as charges on the storage screen. The output signal representative of the adaptive weight values is then amplified by the amplifier 40 and converted to a scanning photon beam by the cathode ray tube 24. The photon beam is then modulated by the transmissivity characteristics of the transparency 22 and converted by the sensor 30 back to an electrical signal proportional to the product of the adaptive weight values and the input values, the product actually being squared by the sensor 30. The electrical signal is then multiplied by a proportionality factor in the training control 34 as determined by the particular training procedure being used. Probably the most conventional training procedure involves changing each discrete weight value on the storage tube by a proportionality constant multiplied by the corresponding value of the input data, wherein the proportionality constant is determined by the nearness of the integration value to the correct threshold value. The training adjusted signal is then used to modulate the beam of the write gun and thereby adapt the weight values stored as charges on the storage screen of the storage tube 36.

Each transparency of the training set is successively placed in the position of the transparency 22 and the training procedure repeated. The steady state beam from the read gun then produces an output signal from the cathode ray storage tube which carries the adaptive weight values stored in the space domain on the storage screen. The output signal is passed through corresponding portions of the data transparency 22 by the cathode ray tube 24 and collimating means 26 such that the signal reaching the sensor 30 is representative of the product of the adaptive weight value stored at a corresponding spatial point on the storage screen and the input data at the corresponding point on the transparency 22. The signal is then integrated and compared to the threshold values. Based upon the relationship of the integration value to the correct threshold value, the training control 34 then modulates the signal from the sensor 30 in accordance with the training procedures and the corresponding adaptive weight on the storage screen is thereby increased or decreased as required in order to move the integration value toward the desired threshold value.

As previously mentioned, a large number of training procedures may be employed. Probably the most conventional training procedure involves changing each discrete weight value on the storage tube by the same proportion of its absolute value, the proportion being determined by the nearness of the integration values to the correct threshold value. The weight values may be changed until the correct classification is achieved, or may be merely changed to produce a movement of the integration value toward the correct threshold level. In any event, it is to be understood that any desired training procedure may be used in the present invention. The system 20 is particularly adapted for rapid convergence training because the training cycle can be repeated until no signal is supplied to the training control from the integrator and threshold circuit 32. Thus during repeated scanning of the same training data transparency, the charge at the various discrete spatial points of the storage tube may be continually changed until the desired threshold value is reached.

All sets of training transparencies are repeatedly cycled through the system 20 and the training procedure repeated for each transparency until the system makes no errors, or until the number of errors made by the system is reduced to a minimum, at which time maximum convergence of the system for the particular set of training data will have been attained.

After the system 20 has been trained, it may be operated in the decision mode to classify input data in accordance with the system's prior training experience. In the decision mode, the training control 34 and the write gun of the cathode ray storage tube 36 are disabled. The transparency 22 then carries the input data which is to be classified by the system. The steady state source 38 produces a steady state beam which from the read gun of the cathode ray storage tube 36 which is modulated in accordance with the adaptive weight charges stored at the discrete points on the storage screen. Thus the adaptive weight data stored in the spatial domain on the storage screen is converted to data in the time domain which may be carried by the electrical signal. This signal is then amplified by the amplifier 40 and converted to a scanning photon beam by the cathode ray tube 24 and collimating lens means 26. The photon beam carries the adaptive weight values in the time domain and is sequentially modulated by the spatially stored data on the transparency 22 as the latter is scanned by the photon beam in synchronism with the read beam so that at each point in time, the adaptive weight value is multiplied by the transmissivity of the corresponding input value in the space domain of the transparency. The modulated photon beam is then converted to an electrical signal by the sensor 30 which is proportional to the value stored at corresponding spatial points on the storage screen of the tube 36 and on the transparency 22. Therefore at any point in time, the amplitude of the electric signal will be equivalent to the input current signal $I_n$ passed through the adaptive element $E_n$ in the Adaline system 10, except that the signal is squared by the photon sensor 30. The signal through each of the discrete points of the input data transparency 22 and the storage screen of the tube 36 are then summed by integration and compared to one or more threshold values by the circuit 32. Thus it will be noted that both the adaptive weight information and the input data are stored in the spatial domain and modulate a scanning beam of energy to produce a product signal in the time domain. The time domain product signal is then integrated with respect to time to produce a summation signal which is compared with the threshold value.

The cathode ray storage tube has the capacity to store data for several hours without significant degradation of the information. However, it is highly desirable to be able to produce a permanent record of the adaptive weight values stored on the screen of the cathode ray storage tube 36. This can easily be accomplished by means of the cathode ray tube 42 and the recording camera 48 which, as previously mentioned, may merely comprise a suitable camera for making a transparency having transmissivity corresponding to the illumination of the face of the tube 42. The adaptive weight values thus produced by the recorder 48 in the form of a transparency may easily be restored to the storage screen of the cathode ray tube 36 by inserting the transparency between the lens 26 and the lens 28. Then the cathode ray tube 24 is operated from a steady state source (not illustrated) such that the photon beam will be modulated by the transparency 22 and the resulting value stored on the storage screen of the cathode ray storage tube 36 by the electron beam of the latter's write gun. The system 20 can then be used for making decisions as previously described, or the weight values stored on the screen of the cathode ray storage tube 36 can be further adjusted by further training data as desired. This provides a means whereby the adapted weight values on the storage screen may be representative of experience dating back a considerable period of time and eliminates the necessity of repeating the training procedure with all previous training data if desired. The adaptive weight values may also be stored permanently on a magnetic tape operated in synchronism with the scanning beam. In such a case, the output from the tube 36 would be recorded and subsequently replayed to modulate the write beam of the tube.

Figure 4:
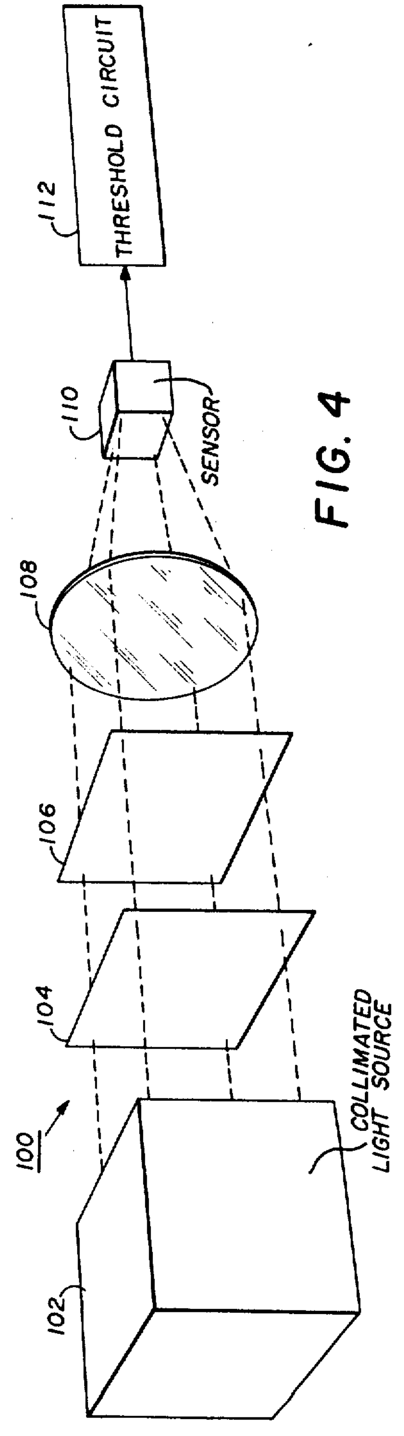
FIGURE 4 is a schematic illustration of a slave classification system constructed in accordance with the present invention.

In accordance with another important aspect of the invention, the adaptive weight values recorded as a transparency by the recording camera 48 may be used in a simplified slave system such as that indicated generally by the reference numeral 100 in FIGURE 4. The slave system 100 comprises a collimated light source 102 for producing a column of light of uniform intensity over its aperture. Means are provided for disposing a pair of transparencies 104 and 106 in proper register such that the collimated light source will pass through corresponding parts of the two transparencies. The total quantity of light passing through both transparencies 104 and 106 is sensed by a suitable means such as the focusing lens 108 and the sensor 110 which produces an electrical signal proportional to the total intensity of the beam as modulated by the transparencies and weight values. The output from the sensor 110 is applied to a threshold circuit 112 for comparing the level of the signal from the sensor 110 with one or more threshold values for classification. The transparencies 104 and 106 are the transparencies carrying the adaptive weight data such as that produced by the recording camera 48 and a transparency containing the input data which is to be classified by the system. It will be appreciated that the order in which transparencies are positioned with regard to the collimated light source 102 is immaterial since at each discrete point the beam of light will be modulated by the product of the transmissivity of both of the transparencies. Thus each discrete point on the transparency carrying the adaptive weight values corresponds to an adaptive element which modulates the carrier signal, which in this case is photon or other radiant energy, in accordance with the transmissivity at that point. The energy is similarly modulated by the transmissivity of the input data transparency so that for each discrete point a product signal corresponding to the signals $I_1$–$I_n$ is produced. These product signals are then summed by the lens 108 and sensor 110 and the sum compared with one or more threshold values to classify the input data.

Figure 5:
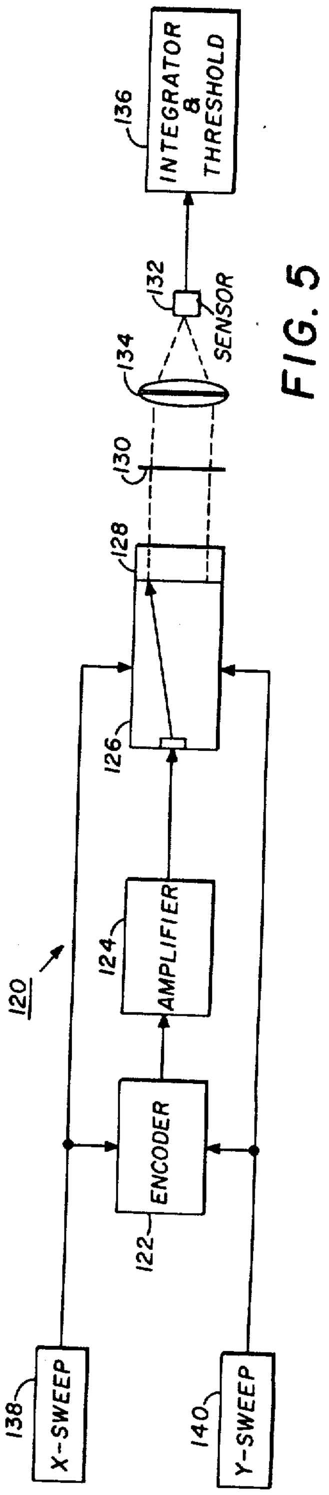
FIGURE 5 is a schematic block diagram of another slave classification system constructed in accordance with the present invention.

Another slave system which may utilize the photographic transparency of the adaptive weights produced by the recording camera 48 of the system 20 is indicated generally by the reference numeral 120 in FIGURE 5. The system 120 is similar to the system 100 except that the input data may be in the time domain rather than in the space domain as represented by the transparency. Thus a data source or encoder 122 is operated in synchronism with the cathode ray tube 124 to produce a time domain signal representative of the input data which is to be classified. The output from the encoder 122 is amplified by the amplifier 124 and modulates the beam of the cathode ray tube 126. The cathode ray tube 126 is operated in synchronism with the encoder 122 as represented by the X-sweep and the Y-sweep generators 138 and 140. The photon energy produced at the face of the cathode ray tube 126 by the scanning beam is collimated by a suitable lens means 128 and passed through the transparency 130 which modulates the energy in accordance with the transmissivity of the points on the transparency through which the photon beam passes. The modulated photon beam is then directed to a sensor 132 by the lens 134. The sensor 132 produces an electrical signal representative of the modulated photon beam which is applied to an integrator and threshold circuit 136. The integrator and threshold circuit 136 integrates the time domain signal over a period of time at least as great as the period required to completely scan the transparency 130 and compares the integrated value with one or more threshold values so as to classify the data from the encoder 122 as heretofore described.

Figure 6:
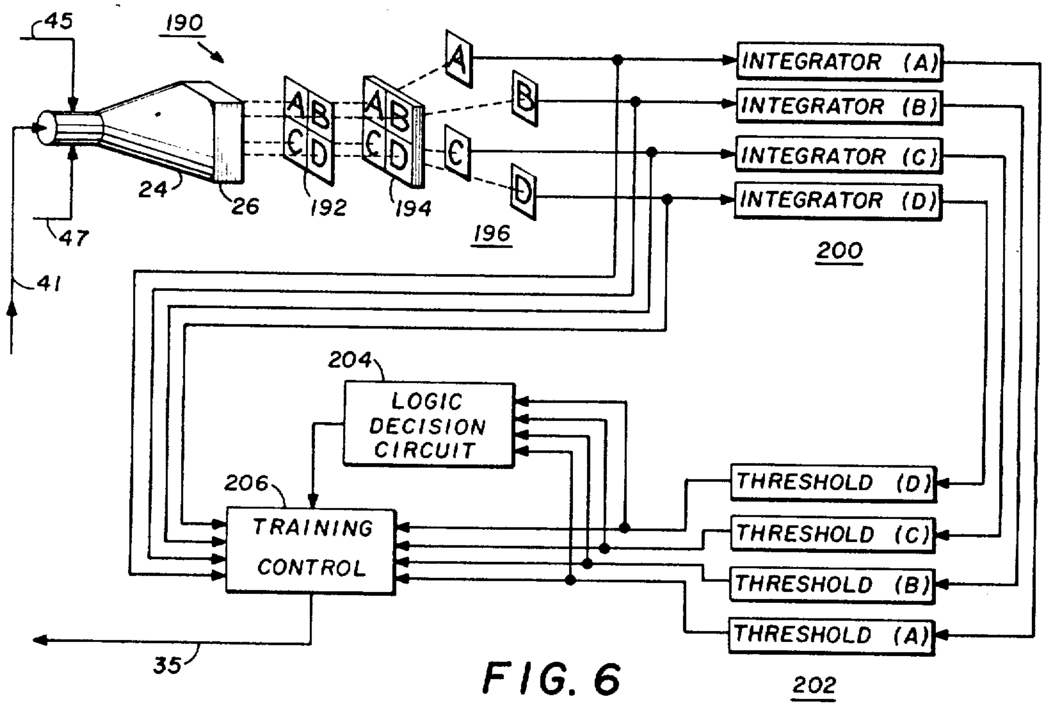
FIGURE 6 is a schematic diagram illustrating a modification of the system of FIGURE 2 and is to be considered in conjunction with FIGURE 2.

Referring now to FIGURE 6, another embodiment of a training adjusted decision system constructed in accordance with this invention is indicated generally by the reference numeral 190. The system 190 is similar to the system 20 and is to be considered in conjunction with system 20 with corresponding portions designated by corresponding reference numerals. The system 20 of FIGURE 2 is equivalent to an Adaline system in which all of the signals modulated by the input data and the adaptive weight data are applied to a single sensor 30 and the output from the sensor summed by a single integrator and compared by a single threshold circuit. Since the cathode ray storage tube 36 ideally has as many as 1,000 TV lines resolution, the storage screen of the cathode ray storage tube ideally has the equivalent of $10^6$ adaptive elements corresponding to the element $E_1$–$E_n$ shown in the Adaline system of FIGURE 1. However, a more practical estimate of the number of realizable adaptive weight elements is $10^4$ because of the problem of synchronously operating the various scanning beams. Although such a number of adaptive elements increases the accuracy of the Adaline system, this large number of adaptive elements is normally not required for a single neuron type network and can best be resolved into a number of separate neuron networks so as to accomplish more complicated classification problems.

The system 190 shown in FIGURE 6 utilizes the steady state source 38, the cathode ray storage tube 36, the amplifier 40, the cathode ray tubes 42 and 24, the recorder 48, and the X-sweep and Y-sweep generators 44 and 46, all shown in FIGURE 2 but omitted from FIGURE 6 except 24 to simplify the illustration. However in the system 190, the input data transparency 192 is reproduced in a plurality of matrixes or areas. For example, separate reproductions of the input data might be represented in the matrix areas A, B, C, and D. Such input data may be produced with a so-called "fly's eye" lens or other suitable photographic technique. It will be understood, however, that any number of matrix areas can be utilized as desired, four being selected merely for ease of illustration. A suitable optical sensing system is then provided to separately sense the photon or other energy passing through the individual matrix areas A–D of the transparency. For example, an optical lens 194 having four separate channels A, B, C, D might project the light onto four separate sensors 196A–196D, respectively. Each of the sensors 196A–196D produces a separate electrical signal which is applied to integrators 200A–200D, respectively. The integration value from the integrators 200A–200D are applied to threshold circuits 202A–202D, respectively, where the respective integration values are compared to one or more threshold levels. The outputs from the threshold circuits 202A–202D are applied to a logic decision system 204 which may comprise any desired logic system for producing the desired decision surface. For example, the logic decision circuit 204 may be connected for "majority rule" so as to make a decision based on the decision of a majority of the thresholds 202A–202D. Or the logic decision circuit 204 may require any other combination of decisions from the threshold circuits 202A–202D to reach a particular decision.

An output from the logic system 204, and outputs from the thresholds 202A–202D may be applied to the training control 206 so that the signals from each of the sensors 196A–196D, which are also applied to the training control 206, can be modulated in accordance with the decisions reached and the particular training procedure being used. The training adjusted outputs from the sensors 196A–196D can then be applied through the conductor 35 to modulate the beam of the write gun of the cathode ray storage tube 36 and thereby adapt the adaptive weights stored on the storage screen of the tube 36 in the segregated matrix area corresponding to the areas A–D of the transparency 192. It will be noted that the training procedure may take into consideration the threshold value from any particular matrix area A–D as well as the total decision from the logic decision circuit 204. Any one or all of the signals from the sensors 196A–196D may be modulated as required in order to train the system to reach the correct decisions. It will also be appreciated that the electron beams of the cathode ray tube 24 and the cathode ray storage tube 36 may be scanned in any manner so long as the beams are synchronized. For example, the matrix areas A–D may be successively scanned in their entirety, or the entire transparency 192 may be scanned without regard to the boundaries of the matrix areas A–D.

The system 190 has been described as a complete trainable decision system. However, it is to be understood that the adaptive weights for the plurality matrix areas may be permanently recorded by the recording camera 48 as a photographic transparency for use in a slave system as heretofore described. For example, in a system utilizing time domain input data such as the system 120, the slave system would also have a corresponding arrangement of lens 194, sensors 196, integrators 200, thresholds 202 and a logic decision circuit 204. In a slave system utilizing a collimated light source and input data in the space domain, such as the system 100, the integrators would be eliminated but a plurality of sensors 196 and a plurality of threshold circuits 202 would be used with a logic decision circuit. Since the collimated light source reads out all adaptive and input weights simultaneously, the integrator circuits are not required in such a system.

Figure 7:
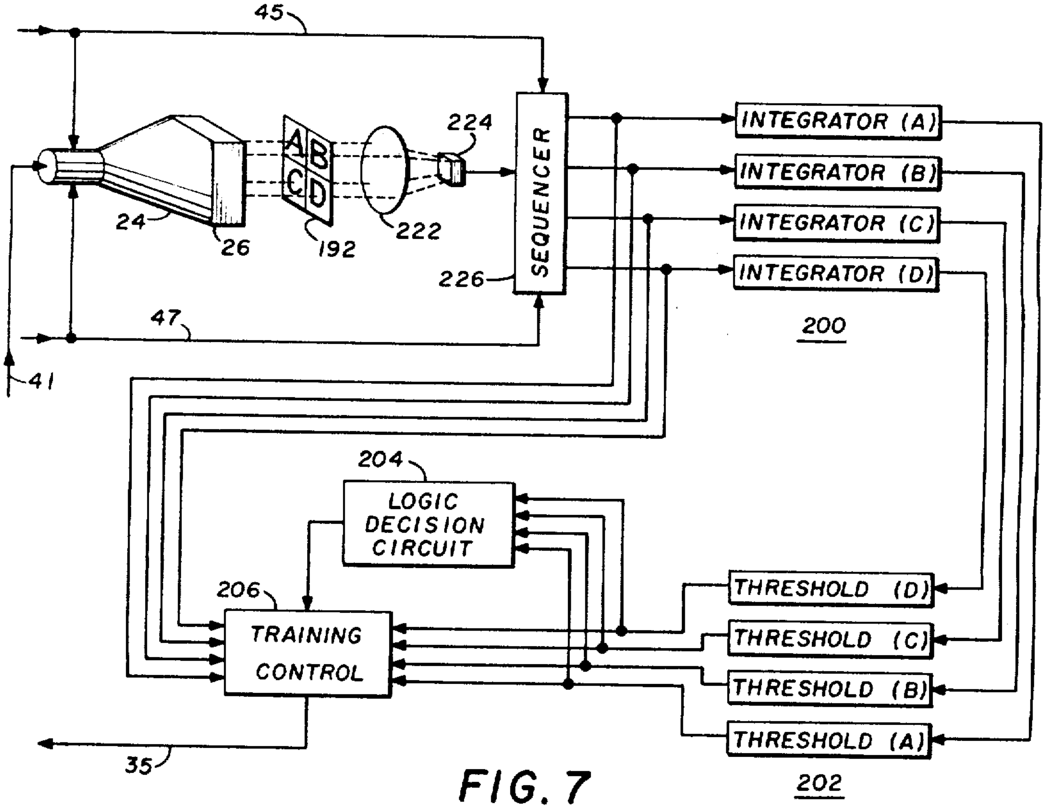
FIGURE 7 is a schematic diagram of another modification of the system of FIGURE 2 and should also be considered in conjunction with FIGURE 2.

Another modification of the training adjusted decision system is indicated generally by the reference numeral 220 in FIGURE 7. The system 220 is similar to the system 190 and corresponding components are therefore designated by corresponding reference numerals. However, rather than using the multichannel optical system 194 and the plurality of sensors 196A–196D shown in FIGURE 6, a single focusing lens 222 and a single sensor 224 are used to sense the modulated photon beam passing through all of the matrix areas A–D. The signals resulting from the several matrix areas A–D are then separated in the time domain and channeled through the proper integrator 200A–200D by a sequencer 226 which is synchronized with the sweep of the beam of the cathode ray tube 24 as represented by the connection of the X-sweep and Y-sweep conductors 45 and 47. The operation of the system 220 is substantially the same as the system 190 except that the signals from the separate matrix areas are separated in the time domain rather than in the space domain.

Figure 8:
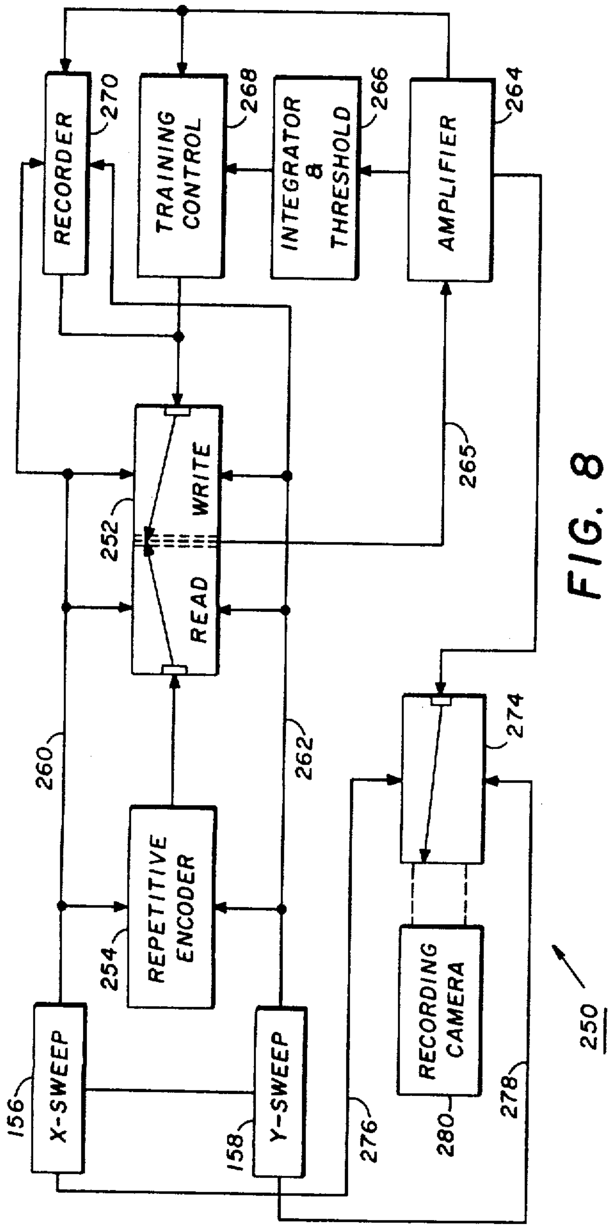
FIGURE 8 is a schematic block diagram of another training adjusted decision system constructed in accordance with the present invention.

Referring now to FIGURE 8, another training adjusted decision system constructed in accordance with the present invention is indicated generally by the reference numeral 250. The system 250 utilizes the storage screen of a cathode ray storage tube 252 of the type heretofore described for storing the adaptive weight values in a spatial matrix. The operation of the system 250 is similar to that of the system 20 except that input data is introduced to the system by modulating the electron beam of the read gun of the cathode ray storage tube 252. Thus the input data is put in the time domain by a repetitive encoder 254 which is capable of repeating the input data as many times as required. The input data may be taken from punched cards by a sequencer or may initially be in the form of a time domain signal. The repetitive encoder 254 is operated in synchronism with the beams of both the read and write guns of the cathode ray storage tube 252 as indicated by the X-sweep and Y-sweep generators 156 and 158 and the conductors 260 and 262. The output from the cathode ray storage tube 252 is applied to an amplifier 264 by the conductor 265. The output from the amplifier is applied to an integrator and threshold circuit 266 which may be substantially identical to the integrator and threshold circuit 32 illustrated in FIGURE 2. The output from the amplifier 264 is also applied to a training control 268 which may be substantially the same as the training control 34 in FIGURE 2. The output from the integrator and threshold circuit is also applied to the training control 268 so that the signal from the amplifier 264 may be modulated by the training control in accordance with the state of the integrator and threshold circuit 166 as heretofore described. The output from the training control 268 is used to modulate the write beam of the cathode ray storage tube 252. The output from the amplifier 264 may also be applied to a recorder 270. The recorder 270 may be a magnetic tape recorder, or the like, for recording the electrical signal from the output of the cathode storage tube 252 which is representative of the adaptive weights stored on the storage screen. The recorder 270 should be operated in synchronism with the sweep of the beams of the storage tube, as represented by the conductors 260 and 262, so that the time domain data recorded by the recorder may be restored to the proper points on the matrix of the storage screen. The recorded signal may then be reproduced and applied to modulate the beam of the write gun of the cathode ray storage tube 252 to restore the adaptive weight values to the storage screen. The output from the amplifier 264 may also be applied to modulate the beam of a cathode ray tube 274 which is operated in synchronism with the cathode ray storage tube 252 as represented by the X-sweep and Y-sweep conductors 276 and 278. The image on the screen of the cathode ray tube 274 may be photographed by a recording camera 280 to produce photographic transparencies of the adaptive weight data stored on the screen of the tube 252 for use in a slave system such as the system 100 or 120. The system 250 can also be used to convert the time domain input data to space domain input data by connecting the output from the repetitive encoder to modulate the beam of the tube 274. This can be done by passing the signal through the tube 252 and the amplifier 264 if desired.

Thus in operation of the system 250, the storage screen of the cathode ray storage tube 252 is initially uniformly charged. The repetitive encoder 254 then modulates the electron beam of the read gun of storage tube 252 so that the output from the storage tube 252 is merely the input data. The signal is passed through the amplifier 264 to the integrator and threshold circuit 266. The time domain electrical signal representative of the input data is then integrated and the integrated value compared to one or more thresholds for classification. Depending upon the relationship of the summation value to a particular threshold value, the training control 268 modulates the output from the amplifier 264 so as to move the summation value toward the threshold value indicative of the correct classification of the input data. The training adjusted signal from the training control 268 is applied to modulate the write beam of the storage tube 252 and thereby adapt the weight values stored on the storage screen. The repetitive encoder 254 permits the scanning cycle to be repeated as many times as desired in order to obtain an integration value and adapt the weight values.

The next set of input training data is then introduced to the system by the repetitive encoder 254 and applied to the cathode of the read gun of the cathode ray storage tube 252. The input data is further modulated by the weight values stored at the discrete points on the storage screen of the tube 252 so that the output from the storage tube 252 is representative of the product of each discrete input value and the corresponding adaptive weight value. The product output signal is then integrated and compared to one or more threshold values by the circuit 266. The product signal from the amplifier 264 is then modulated by the training control 268 in accordance with the signal from the integrator and threshold circuit 266 and the weight value on the storage screen adapted by the beam of the write gun of the storage tube 252.

After the training procedure has been completed as heretofore described, the input data which is to be classified is then introduced to the system by the encoder 254. This time domain signal from the encoder 254 is carried by the electron beam of the read gun and is modulated by the adapted values stored at the storage screen. The output signal from the cathode ray storage tube 252 is then amplified, integrated and compared to one or more threshold values for classification.

As previously mentioned, the cathode ray storage tube 252 will store the adaptive weight data for a considerable period of time. However, in many instances it is desirable to retain the adaptive weight data for an indefinite period of time. In such a case, the adaptive weight data may be read out by a steady state signal from the repetitive encoder 254 which will then produce an output signal from the storage tube carrying only the adaptive weight data. The output signal may then be amplified and recorded either by the recorder 270, or by the cathode ray tube 274 and the recording camera 280 as previously described in connection with the system 20 shown in FIGURE 2. The adaptive weight data stored on the transparency may then be used in slave systems, such as the systems 100 and 120 shown in FIGURES 4 and 5, respectively, or may be restored to the screen of the tube 252 by an arrangement such as the cathode ray tube 24, lens system 26 and 28 and sensor 30 for converting the space domain data back to time domain data.

Figure 9:
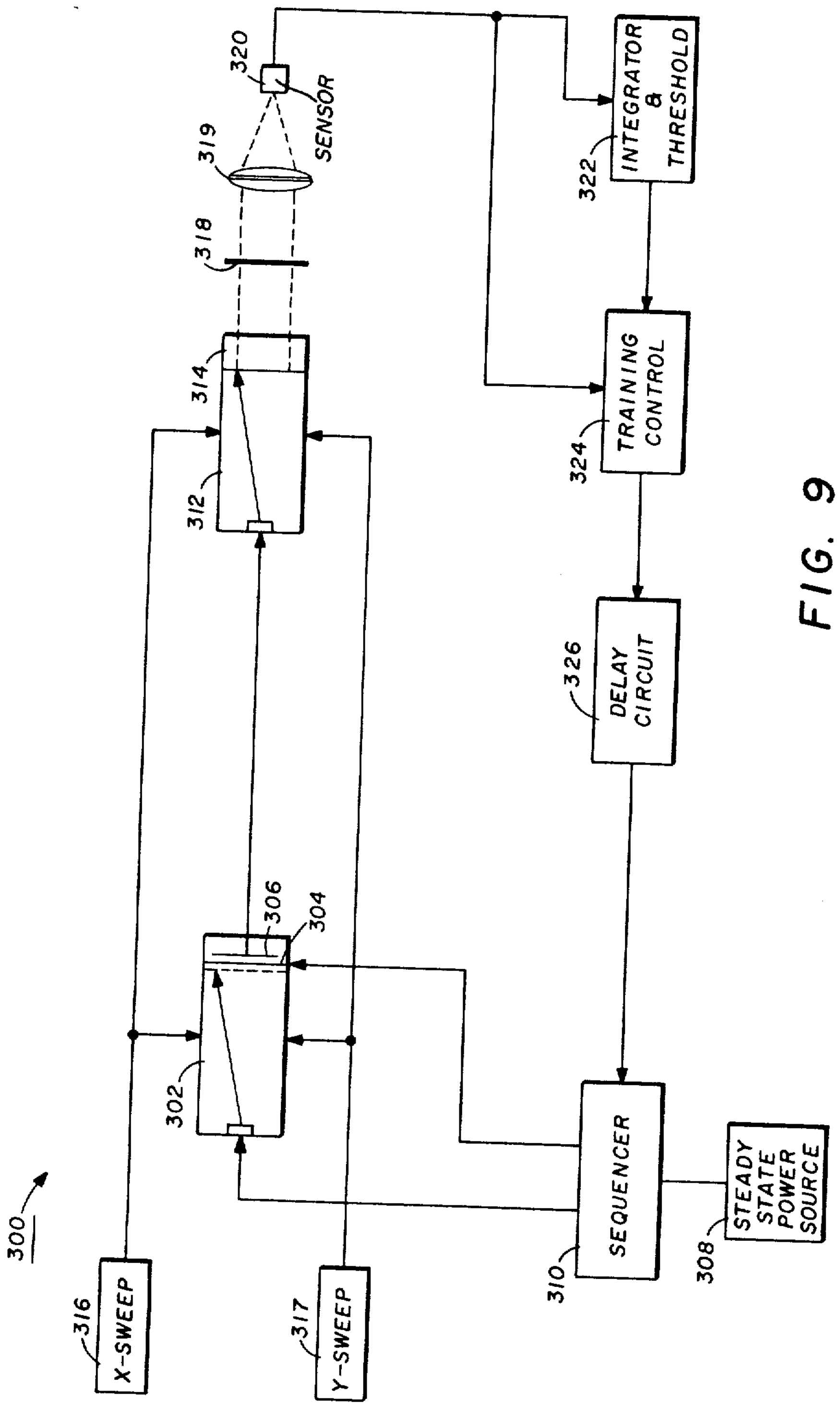
FIGURE 9 is a schematic block diagram of another training adjusted decision system constructed in accordance with the present invention.

Another training adjusted decision system constructed in accordance with the present invention is indicated generally by the reference numeral 300 in FIGURE 9. The system 300 is substantially equivalent to the system 20 shown in FIGURE 2, except that the dual gun cathode ray storage tube 36 is replaced by a single gun cathode ray storage tube 302. Single gun storage tubes are also commercially available from the sources listed above in connection with the dual gun storage tubes. The storage tube 302 is the equivalent of the storage tube 36 and has a very similar operation, except that the same beam is used in both the read and write modes.

The tube 302 has a fine mesh metal storage screen 304 with about one million holes per square inch which is coated on one side with a dielectric material. The scanning electron beam is directed against the dielectric surface and, depending upon the voltage of that surface at any instant of time, the beam either increases or decreases the charge on the dielectric or is modulated as it passes through the screen in accordance with the charge stored at that particular point. For purposes of this invention, the write mode includes both the conventional erase mode for negative adjustments and the conventional write mode for the positive adjustments. In the conventional erase mode, the storage screen is set at a voltage below the critical potential of the dielectric material so that when the surface is scanned with the D.C. beam, it charges negatively to cathode potential and the previously written signals are decreased. For the positive write mode, the storage screen voltage is elevated substantially above critical potential so that the values stored on the storage screen will be increased by the scanning beam. In the read mode of operation, the storage screen voltage is switched to a value such that the front surface of the dielectric is sufficiently negative to prevent electrons from passing through the storage screen toward the collector or output electrode 306. Thus in regions where the dielectric surface is less negative than the cutoff value of voltage, the portion of the electron beam that is a function of the voltage of that surface will pass through the storage screen and produce an output signal at the collector electrode representative of the stored charge.

A steady state source 308 is passed through a sequencer circuit 310 and modulates the beam from the cathode of the storage tube 302 to produce a steady state beam. This steady state beam is then passed through and is modulated by the storage screen as the beam scans the storage screen to produce an output signal on the collector electrode 306 which is proportional to the value stored at the discrete point on the storage screen scanned by the beam. The output signal is applied to modulate the beam of a cathode ray tube 312. The beam of cathode ray tube 312 scans the screen of said tube in synchronism with the beam of the storage tube 302 as represented by the X-sweep and Y-sweep generators 316 and 317. The cathode ray tube 312 converts the time domain electrical signal to a corresponding optical signal scanned in synchronism with the beam of the storage tube. The optical signal is directed through a photographic transparency 318 the transmissivity of which is representative of input data as heretofore described so that the optical energy is modulated in accordance with the input data. The photon energy passing through the transparency 318 is collected by a lens 319 and converted by a photon sensor 320 to an electrical signal proportional to the square of the photon energy.

The electrical signal from the sensor 320 is then fed to an integrator and threshold circuit 322 where it is integrated and compared to a threshold value to provide a basis for classification and training adjustments. The output signal from the sensor 320 is also applied to a training control circuit 324 which modulates the instantaneous values of the signal in accordance with the relationship of the integration value to the threshold value and a predetermined training procedure as heretofore described. The training adjusted signal from the training control 324 is then delayed by a suitable conventional delay circuit 326.

After the read mode of the tube 302 is completed, the delayed training adjusted signal is applied to modulate the beam of the storage tube 302 by the sequencer 310 so as to adjust the values stored on the storage screen of the tube during the next scanning cycle of the storage tube 302. Thus the sequencer 310 first connects the steady state source 308 to modulate the beam of the tube 302 and simultaneously adjusts the potential of the storage screen 304 to the read mode for at least one scanning cycle. Then during a subsequent scanning cycle, the sequencer 310 connects the delay circuit to modulate the cathode of the tube 302 and simultaneously adjusts the voltage of the storage screen to the write mode so that the adaptive weight values stored on the screen will be adjusted in accordance with the training adjusted signal. It will be appreciated that the write mode is intended to include both increases and decreases in the stored values so as to accomplish both positive and negative adaptive weight values, and that this is accomplished by switching the voltage of the storage screen as required in response to the training signal from the delay circuit 326.

The operation of the system 300 is basically the same as that of system 20. Initially the storage screen is charged to some uniform intermediate value which serves as a zero level. A series of transparencies representative of the range of classification decisions to be made are prepared and the first is inserted at position 318. The steady state power source 308 is connected by the sequencer 310 to modulate the beam from the cathode of the storage tube 302 and the storage screen potential is adjusted to the read mode. This produces a steady state output signal from the collector electrode 306 which is applied to modulate the beam of the cathode ray tube 312. The signal is then converted to photon energy and sequentially projected through successive points on the transparency to convert the spatial domain input data to time domain data. Thus the signal sensed by the sensor 320 corresponds merely to the input data carried by the transparency 316 for the first training cycle.

The signal from the sensor 320 is integrated and compared to threshold value for purposes of classification. In some instances it will be desirable to run the system through one reading scan cycle to provide an integration value, then through a second reading scan cycle so that the comparison of the integration value to the threshold value can be used to set the training control 324. The training control 324 modulates the signal from the sensor 320 prior to delivery to the delay circuit 326 where the training adjusted signal is delayed during the remainder of the second scanning cycle. Then during the third scanning cycle the sequencer 310 disables the steady state power source 308 and connects the delay circuit 326 to the cathode of the storage tube 302 and also sets the storage screen to the write mode. The training adjusted signal is then recorded on the storage screen to provide the training adjusted or adaptive weight values. If desired, the cycle can be repeated with the same input transparency 318 until the weight values have been adjusted to the desired degree.

Next a second transparency from the training set is inserted at 318 and the three cycle sequence repeated. However, during all subsequent training cycles, the steady state beam from the power source 308 will be modulated by the weight values stored on the storage screen 304 so that the signal from the sensor 320 will be the square of the product of the adaptive weight value stored on the screen 304 and the input value at the corresponding position on the transparency 318. The squaring function is inherent in most photon sensors, and although undesirable in the present system, is acceptable. This product signal is then integrated and compared to a threshold value to set the training control circuit. The scanning cycle is then repeated so that the training control can adjust the product signal and the training adjusted signal delayed until a third scanning cycle when it is recorded to further adjust the adaptive weight values on the storage screen 304.

As described in connection with the preceding systems, the adaptive weight values stored by the storage tube 302 may be permanently recorded by utilizing the steady state power source 308 and substituting a photographic plate for the photo transparency 318. At a later time, the adaptive weight values can then be restored to the screen 304 by positioning a transparency containing the recorded adaptive weight values at position 318, producing a uniform charge on the storage screen 304, and utilizing the steady state power source to convert the adaptive weight values stored on the photographic transparency to a time domain electrical signal which can be delayed in the delay circuit 326 and then recorded on the storage screen during a subsequent scanning cycle. Of course, the photographic transparency of the adaptive weights can also be used in the slave system described above.

From the above detailed description of several embodiments of the invention, it will be appreciated that a training adjusted decision system has been described which provides a very large number of adaptive elements for a relatively small cost. The system employs no individual lead wires to the individual adaptive elements, is relatively compact, and utilizes a minimum number of components which are generally available on the commercial market. The system is capable of handling data in both the time domain and space domain, and is particularly adapted for handling photographically processed data.

Although several preferred embodiments of the invention have been described in detail, it is to be understood that various changes, substitutions and alterations can be made in the steps and components of the invention without departing from the spirit and scope of the invention as defined by the appended claims.

What is claimed is:

1. The decision system which comprises:

a matrix of storage elements for modulating the signal carried by a beam of carrier energy in accordance with the weight value stored by each element of the matrix of elements as the beam scans said matrix of elements, first means for producing a second beam of carrier energy that scans the storage elements in said matrix to produce a time domain signal representative of the weight values stored by the respective storage elements, second means for translating said time domain signal to an optical time domain signal, third means for modulating said optical time domain signal in accordance with input data to produce an optical product signal, fourth means for translating said optical product signal to an electrical product signal, and fifth means for integrating said electrical product signal to obtain an integrated value and comparing said value with a threshold value to provide a basis for decision.

2. The system defined in claim 1 in which said matrix of storage elements is contained in the storage screen of a cathode ray storage tube.

3. The training adjusted decision system which comprises:

a matrix of adaptive storage elements, each of said adaptive storage elements containing a weight value which is a function of the energy striking each of said elements, first means for scanning the matrix of adaptive storage elements with a beam of energy to produce an optical output signal representative of the weight value stored by said adaptive storage elements, second means optically coupled to the first means for modulating the optical output signal in accordance with a set of input values to produce a product signal, third means optically coupled to the first and second means for integrating the product signal and comparing the integrated value to a threshold value to provide a basis for a decision, training control means for adjusting the product signal in accordance with a predetermined training procedure to produce a training control signal, and means for scanning the matrix of adaptive storage elements with a second beam of energy modulated in accordance with the training control signal for adapting the weight values stored by the respective adaptive storage elements.

4. The training adjusted decision system which comprises:

a cathode ray storage tube having storage screen, a first scanning beam for storing weight values at discrete points on the storage screen of said tube during operation of the system in a write mode, a training input signal for modulating said scanning beam in accordance with the weight values to be stored, a second scanning beam for converting the weight values stored at discrete points to a time domain output signal during operation of the system in a read mode, means connected to the storage tube for further modulating the time domain output signal in accordance with a set of input data to produce a product signal representative of the product of input data and the weight values stored on the storage screen, integration and threshold means connected to receive the product signal to obtain an integration value for integrating the product signal and comparing the integration value to a threshold value to produce a decision, and training control means for modulating the product signal in accordance with the comparison of the integration value and the threshold value to produce the training input signal to the cathode ray storage tube.

5. The training adjusted decision system defined in claim 4 in which the cathode ray storage tube has a write gun and a read gun the electron beams of which are operated in synchronism.

6. The training adjusted decision system defined in claim 4 wherein:

the cathode ray storage tube has a single gun for reading and writing and is further characterized by a delay circuit for delaying the training input signal, and sequencer means are provided for alternately switching the storage tube between read and write modes and for alternately reproducing the weight values stored on the storage screen and for writing the delayed training control signal on the storage screen.

7. The training adjusted decision system defined in claim 5 in which the means for further modulating the output signal comprises:

means for modulating the electron beam of the read gun.

8. The training adjusted decision system defined in claim 5 in which the means for further modulating the time domain signal comprises:

a cathode ray tube the beam of which is operated in synchronism with the read beam of the cathode ray storage tube to illuminate a screen, and which is modulated by the output signal from the cathode ray storage tube to convert the output signal to a scanning photon beam, and a matrix having input data represented by transmissivity disposed to modulate the scanning photon beam and produce a product signal for integration.

9. A training adjusted classification system comprising:

a cathode ray storage tube having a storage screen, comprising an array of adaptive elements for storing adaptive weight values therein, a read beam for scanning said storage screen and producing an output signal representative of the weight value stored at the scanned adaptive element on the storage screen, and a write beam for scanning said storage screen to change the weight values stored on the storage screen in proportion to the intensity of the write beam, the read and write beams being operated in synchronism over corresponding adaptive elements on the storage screen, a cathode ray tube the beam of which scans a luminescent screen in synchronism with the beams of the cathode ray storage tube, circuit means connecting the output of the cathode ray storage tube to the cathode ray tube to modulate the beam of the cathode ray tube in accordance with the output signal from the cathode ray storage tube, means for projecting the optical energy from the luminescent screen through a transparency the transmissivity of the transparency being representative of input data, sensing means for sensing the optical energy passing through the transparency and producing an electrical product signal representative of the intensity of the optical energy, integration and threshold means connected to the sensing means for integrating the product signal to obtain an integration value and comparing the integration value to a threshold value to provide a basis for classification, training control means connected to the sensing means and to the integration and threshold means for adjusting the product signal in accordance with the relationship between the integration value and the threshold value and a predetermined training procedure to produce a training adjusted signal, and circuit means connecting the training control means to the cathode ray storage tube for modulating the write beam of said cathode ray storage tube in accordance with the training adjusted signal to adjust the adaptive weight values stored on the storage screen.

10. A training adjusted classification system comprising:

a cathode ray storage tube having storage screen comprising an array of adaptive elements for storing adaptive weight values, means for operating a modulated beam over the storage screen, and means for varying the voltage of the storage screen to provide a read mode wherein an output signal is produced proportionately to the weight values stored on the storage screen at the point scanned by the beam and a write mode for varying the weight value stored on the adaptive elements of the storage screen in accordance with the intensity of the beam, a cathode ray tube the beam of which is operated over a luminescent screen in synchronism with the beam of the cathode ray stòrage tube to produce optical energy of proportional intensity, circuit means connecting the output from the read mode of the cathode ray storage tube to the cathode ray tube to modulate the intensity of the beam of the cathode ray tube, means for projecting the optical energy from the screen of the cathode ray tube through a transparency the transmissivity of the transparency being representative of input data, sensing means for sensing the optical energy passed through the transparency and producing an electrical product signal representative of the intensity of the optical energy, integration and threshold means electrically connected to the sensing means for integrating the product signal and comparing the integration value to a threshold value to provide a basis for classification, training control means electrically connected to the sensing means and to the integration and threshold means for adjusting the electrical signal in accordance with the relationship between the integration value and the threshold value and a predetermined training procedure to produce a training adjusted signal, delay circuit means connected to the training control means for delaying the training adjusted signal during the read cycle of the cathode ray storage tube, a steady state power source, and sequencer means connected to the delay circuit means, to the steady state power source, and to the cathode ray storage tube for modulating the beam of the cathode ray storage tube with a steady state power source and switching the cathode ray storage tube to read mode, and, alternatively, modulating the beam of the cathode ray storage tube with the delayed training adjusted signal and switching the cathode ray storage tube to write mode.

11. A training adjusted classification system comprising:

means for producing an electrical signal carrying adaptive weight values in the time domain, a cathode ray tube having a luminescent screen and means for scanning said screen with the electron beam of said tube to convert the signal carried by the electron beam to an optical signal, the electron beam being connected to the first mentioned means and modulated in accordance with the electrical signals, means for projecting the optical energy from the luminescent screen through a transparency the transmissivity of which is representative of input data to be classified, a plurality of means for sensing the optical energy passing through a plurality of predetermined areas of the transparency and producing a plurality of electrical product signals each representative of the energy passing through the respective areas, integrator and threshold means connected to each sensing means for integrating the product signal produced by the respective sensing means and comparing the integrated value to a threshold value, and logic circuit means connected to the plurality of integrator and threshold means for producing a decision based upon the relationship of the respective integrated values to the respective threshold values.

12. A training adjusted classification system comprising:

means for producing an electrical signal carrying adaptive weight values in the time domain, a cathode ray tube having a luminescent screen and means for scanning said screen with the electron beam of said tube to convert the electron beam to an optical beam of proportional intensity and corresponding spatial position, the cathode ray tube being connected to the first mentioned means for modulating the electron beam in accordance with the electrical signal, means for projecting the optical energy from the luminescent screen through a transparency the transmissivity of which is representative of input data, sensing means for converting the optical energy passing through all areas of the transparency to an electrical signal, an integrator and threshold circuit means for each of a plurality of predetermined areas of the transparency, sequencer means operated in synchronism with the beam of the cathode ray tube for selectively connecting the signal from the sensing means to the integrator and threshold corresponding to the area through which the optical energy is then passing such that each of the integrator and threshold circuit means will integrate the signal passing through the respective areas of the transparency and compare the integrated value to a threshold value, and logic circuit means connected to the plurality of integrator and threshold means for producing a decision based upon the relationship of the respective integrated values to the respective threshold values.

13. A training adjusted classification system comprising:

a cathode ray storage tube having a storage screen, a read beam for reading said storage screen and producing an output signal representative of the value stored at the corresponding point on the storage screen, and a write beam for scanning said storage screen to change the values stored on the screen in accordance with the intensity of the write beam, the read and write beams being scanned in synchronism over corresponding points on the screen, a repetitive encoder for producing an electrical signal representative of input data connected to modulate the read beam of the cathode ray storage tube, integrator and threshold means connected to the output of the cathode ray storage tube for integrating the output signal and comparing the integrated value to a threshold value to provide a basis for classification, training control means connected to the output of the cathode ray storage tube and to the integrator and threshold means for adjusting the output signal from the cathode ray storage tube in accordance with the relationship between the integration value and the threshold value and a predetermined training procedure to produce a training adjusted signal, and circuit means connecting the training control means to the cathode ray storage tube for modulating the write beam in accordance with the training adjusted signal.

14. A training adjusted classification system comprising:

a cathode ray tube having a beam scanning over a luminescent screen to produce optical energy of proportional intensity and corresponding spatial location, an encoder for producing a time domain signal representative of input data connected to the cathode ray tube to modulate the beam thereof in accordance with the time domain signal, the encoder being operated in synchronism with the scanning beam of the cathode ray tube, a photographic transparency the transmissivity of which at discrete spatial points is representative of training adjusted weight values positioned to modulate the optical energy radiated from corresponding points on the luminescent screen, sensing means for producing an electrical product signal representative of the optical energy passing through the transparency, and integration and threshold means connected to the sensing means for integrating the product signal and comparing the integrated value to a threshold value to provide a basis for classification.

15. A training adjusted classification system comprising:

a storage means having stored therein adaptive weight values in an array of adaptive elements, means for scanning said adaptive elements and producing an output signal representing said weight values, means for changing said weight values, means for producing an optical signal modulated in intensity in accordance with said output signal, means for projecting said modulated optical signal through a transparency, the transmissivity of said transparency being representative of input data, sensing means for sensing said optical signal passing through said transparency and producing an electrical product signal representative of the intensity of said optical signal, integration and threshold means connected to said sensing means for integrating said product signal to obtain an integrated value and comparing said integrated value to a threshold value to provide a basis for classification, training control means electrically connected to said integration and threshold means for adjusting said product signal in accordane with the relationship between said integrated value, said threshold value and a predetermined training procedure to produce a training adjusted signal, and means connecting said training control means to said means for changing said weight values stored on said adaptive elements for adjusting said weight values in accordance with said training adjusted signal.

References Cited

UNITED STATES PATENTS

| | | | |
|---|---|---|---|
| 2,685,615 | 8/1954 | Biddulph et al. | 179—1 |
| 2,922,070 | 1/1960 | Seevers | 315—13 |
| 3,094,644 | 6/1963 | Buckbee et al. | 315—13 |
| 3,175,114 | 3/1965 | Callick et al. | 315—8.5 |
| 3,209,328 | 9/1965 | Bonner | 340—146.3 |
| 3,275,986 | 9/1966 | Dunn et al. | 340—146.3 |
| 3,280,257 | 10/1966 | Orthuber et al. | 179—1 |
| 3,284,772 | 11/1966 | Stewart | 340—146.3 |
| 3,324,457 | 6/1967 | Ogle et al. | 340—172.5 |
| 3,325,787 | 6/1967 | Angell et al. | 340—172.5 |

PAUL J. HENON, *Primary Examiner.*

J. P. VANDENBURG, *Assistant Examiner.*